United States Patent
Starke et al.

(10) Patent No.: US 10,369,928 B2
(45) Date of Patent: Aug. 6, 2019

(54) ENVIRONMENT-DEPENDENT INTERFACE

(71) Applicant: FORD GLOBAL TECHNOLOGIES, LLC, Dearborn, MI (US)

(72) Inventors: Carsten Starke, South Limburg (NL); Stefan Wolter, Wuerselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/933,130

(22) Filed: Mar. 22, 2018

(65) Prior Publication Data

US 2018/0272939 A1 Sep. 27, 2018

(30) Foreign Application Priority Data

Mar. 27, 2017 (DE) .................. 10 2017 205 077

(51) Int. Cl.
*H04N 7/18* (2006.01)
*B60R 1/00* (2006.01)
(Continued)

(52) U.S. Cl.
CPC ............ *B60R 1/00* (2013.01); *B60K 35/00* (2013.01); *B60K 37/02* (2013.01); *G06T 5/002* (2013.01); *G06T 5/003* (2013.01); *G06T 5/50* (2013.01); *H04N 5/272* (2013.01); *H04N 7/18* (2013.01); *H04N 7/183* (2013.01); *B60K 2370/52* (2019.05); *B60K 2370/736* (2019.05); *B60R 2300/207* (2013.01); *B60R 2300/30* (2013.01);
(Continued)

(58) Field of Classification Search
CPC .......... H04N 5/272; H04N 7/18; H04N 7/183; H04N 7/185; B60R 1/00; B60R 2300/207; B60R 2300/30; B60R 2300/605; B60K 35/00; B60K 2350/352; G06T 5/002; G06T 5/003; G06T 2207/30252
USPC ....... 348/148, 143, 169, 116, 118, 239, 252, 348/586, 625; 382/103, 104, 263, 264, 382/274, 275; 345/629, 634, 636, 638; 340/425.5, 441
See application file for complete search history.

(56) References Cited

U.S. PATENT DOCUMENTS

2011/0057783 A1 3/2011 Yagi et al.
2012/0154591 A1* 6/2012 Baur ..................... B60R 1/00
348/148

(Continued)

FOREIGN PATENT DOCUMENTS

DE        19921997 A1    11/2000
DE     102014114329 A1     4/2016
KR      20130107690 A    10/2013

OTHER PUBLICATIONS

DE Examination Report for DE 10 2017 205 077.2 dated Aug. 22, 2017, 6 pages.

*Primary Examiner* — Sherrie Hsia
(74) *Attorney, Agent, or Firm* — Brooks Kushman P.C.; Frank Lollo

(57) ABSTRACT

According to the disclosure, a method is made available to reduce a time duration for an adaption of eyes of a driver of a motor vehicle when changing from events occurring in front of the motor vehicle to a screen arranged in a driver's compartment of the motor vehicle. In particular, the method according to the disclosure also makes a reduction available in the time period for the adaption of the eyes of the driver in the opposite direction.

17 Claims, 4 Drawing Sheets

(51) Int. Cl.
*B60K 35/00* (2006.01)
*G06T 5/00* (2006.01)
*H04N 5/272* (2006.01)
*B60K 37/02* (2006.01)
*G06T 5/50* (2006.01)

(52) U.S. Cl.
CPC ............... *B60R 2300/605* (2013.01); *G06T 2207/20216* (2013.01); *G06T 2207/30252* (2013.01)

(56) References Cited

U.S. PATENT DOCUMENTS

2013/0222212 A1* 8/2013 Lorenz .................. B60K 35/00
 345/7
2013/0250097 A1 9/2013 Choi \* cited by examiner

ENVIRONMENT-DEPENDENT INTERFACE

CROSS-REFERENCE TO RELATED APPLICATIONS

This application claims foreign priority benefits under 35 U.S.C. § 119(a)-(d) to DE Application 10 2017 205 077.2 filed Mar. 27, 2017, which is hereby incorporated by reference in its entirety.

TECHNICAL FIELD

The present disclosure relates to a method and apparatus to reduce a time duration for a driver-eye adaption when changing a view direction from events occurring in front of a vehicle to a screen arranged in a driver's compartment of the motor vehicle.

BACKGROUND

Many people master handling a motor vehicle very well. The control elements of a motor vehicle can nowadays be operated easily and intuitively, and make more frequent use of information technologies outside the motor vehicle. Through penetration of information technology into the motor vehicle, the primary task, namely the driving of the motor vehicle, is moving more and more into the background, while the focus of the driver's concentration has shifted to other activities. This shift is supported, and even reinforced, by a large number of assistance systems. The large number of assistance systems in a motor vehicle induce the driver of the motor vehicle to give his attention to other sources of information in the motor vehicle. The vehicle display in the driver's compartment of the motor vehicle is a primary source of information. Although the screen is located in the driver's field of view, analyses carried out in Japan and in Germany indicate that the majority of accidents occur in the region in front of the motor vehicle. One of the causes is thought to lie with visual distraction. It is, in particular, a result of human perception, based on the fact that greatest concentration is located in the center of the field of view. When observing a screen in a motor vehicle, the driver's greatest concentration is given to the information content of the screen.

Static interface designs demand that concentration of a driver adapts quickly to the static design on the one hand, and to events in front of the motor vehicle on the other hand. The challenge for the driver increases, in particular, at higher motor vehicle speeds. The time that a driver needs, particularly after their eyes have adjusted to the screen, adjusting to the events in front of the motor vehicle can be critical to assessment of an unexpected motor vehicle situation.

KR 10-2013-0107697 discloses a system and a method to reduce visual distraction. The driver receives information about events directly in front of the motor vehicle on a screen. A live image recorded by a camera built into the motor vehicle is here displayed as a background image on the screen. A menu is shown in the foreground.

SUMMARY

It is the object of the present disclosure to make an advantageous method and apparatus available to reduce a time duration for a driver-eye adaptation when changing from events occurring in front of a motor vehicle to a screen arranged in a driver's compartment of the motor vehicle, and vice versa.

According to the disclosure, a method is made available to reduce a time duration for a driver-eye adaptation when changing from events occurring in front of a motor vehicle to a screen arranged in a driver's compartment of the motor vehicle. In particular, the method according to the disclosure makes a reduction in a time period for the driver-eye adaption in an opposite direction available. The method here comprises recording at least one image sequence, processing the recorded image sequence, and displaying the processed image sequence. The at least one image sequence is recorded with the aid of a camera arranged in a direction of travel of the motor vehicle that reproduces events in front of the motor vehicle. The image sequence recorded in this way is processed such that a sharpness impression of individual images of the image sequence is reduced. This processed image sequence is displayed on a screen as a background image sequence. A menu, which is independent of the image sequence, is displayed in a foreground. "Sharpness impression" hereinafter refers to an observer's subjective perception of sharpness, not an objective sharpness of the images. The observer's subjective perception of sharpness is affected by various factors. In addition to image resolution, a range of contrast and a number of brightness steps, amongst other things, play a role in the sharpness impression.

The background of the screen is adapted to an environment, in order to keep an adaption of the driver's eyes as small as possible when changing a direction of view from the events in front of the motor vehicle to the screen. The display should not be enriched with too many details, so that the driver is not distracted more than necessary from a task on the screen. A driver situation in which the driver, when looking at the screen, thinks that they have the vehicle fully under control, should be avoided. In particular, an illusory idea about complete control of the motor vehicle should be avoided when using the screen.

According to one embodiment of the method according to the disclosure, the sharpness impression is reduced through a reduction of the resolution and/or reduction of a contrast range and/or reduction of a number of brightness steps and/or through smoothing the image. The reduction in the resolution has consequence such that fine details of the image sequence are no longer displayed perceptibly for the driver. The sharpness impression is reduced in this way. The reduction of the contrast range causes brightness values of a brightest and darkest tones in the image to converge. Small brightness differences in neighboring pixels exhibiting similar tone values disappear through this convergence in brightness. This leads to a loss of details, and a reduction in the sharpness impression. The same effect also results from a reduction in the number of brightness steps. The lower the number of brightness steps, the more similar individual tonal values become. A sharpness impression thus occurs when the number of the brightness steps is reduced. Individual tonal values are thereby adapted to one another, and lead to a loss of details. The reduction of the contrast range, and the reduction of the number of brightness steps can be applied to a grey-scale image, and to a color image. The contrast range of a color image would be a color saturation, whereas the number of brightness steps corresponds to a number of color steps. It should be noted, a particular tone value of a color is composed of a plurality of base colors. The brightest and the darkest tone values of one base color form the contrast range, or the color saturation, of the base color. The individual color steps in the base color correspond to brightness steps of a grey-scale image. It is furthermore possible to achieve the reduction in the sharpness impression by smoothing the image. When the image is smoothed, the tone values of neighboring pixels are adapted to one another. The image is perceived as "blurred". The smoothing of the image thus reduces the sharpness impression.

A large number of methods and algorithms exist to reduce the sharpness impression. The methods explained here are only those used most frequently. Alternatively, any other method that distorts the image and thus reduces the sharpness impression can also be used. A distortion of a driving situation through a simulation of short-sightedness is explained here as an example.

According to one embodiment of the method according to the disclosure, processing of a recorded image sequence comprises a division of the image sequence into time segments, averaging over images in the respective time segments, and preparation of an averaged image sequence consisting of the averaged images in the respective time segments. The averaged image sequence thus has a lower image refresh rate than that of the recorded image sequence.

According to one embodiment of the method according to the disclosure, the method step of processing is applied to individual images of the averaged image sequence. Two alternative method paths are thus possible. A first method path is that of averaging individual images of an image sequence before reduction of the sharpness impression. A second method path is that of averaging individual images of an image sequence after reduction of the sharpness impression.

According to one embodiment of the method of the disclosure, the processing of the image sequence is done in such a way that a mean tone value of the image is determined for each image of the image sequence, and the image is displayed with this tone value. The mean tone value depends on the events in front of the motor vehicle, and in particular reproduces greater brightness differences. In particular, when driving at night on a road lit by streetlamps, brightness differences affect a perception of the driver of the motor vehicle.

A frequency with which images of the image sequence are recorded depends on an updating frequency. Values of the updating frequency vary between two limit values. A lower limit value is selected such that the image sequence is perceived as a stationary image. The updating frequency is thus so low that an updating of the background image during a period of time in which the driver sees the screen, does not result in a change of image. A second, upper limit value is selected such that the image sequence is perceived as a flicker-free film. The upper limit value thus corresponds to a live display.

According to one embodiment of the method according to the disclosure, the updating frequency depends on a speed of the motor vehicle. The faster the motor vehicle, the higher the updating frequency can be. At high speed, however, the updating frequency can also be reduced, so that the driver is not distracted by sight of the screen at a high updating frequency. There is, furthermore, a possibility of raising the updating frequency at low speeds, so that reaction can be faster in a hazardous situation, for example in side streets.

In one advantageous embodiment of the method according to the disclosure, display of the background image sequence can be adjusted individually. On the one hand, a time offset between recording of an image of the image sequence and reproduction of the image of the image sequence can be varied. On the other hand, distortion of the individual images can be adjusted individually.

According to the disclosure, an apparatus is made available to carry out a method according to the disclosure or its further developments. The method comprises a screen, a camera and a processing module. The screen is arranged in a driver's compartment of a motor vehicle, and is designed to display a processed image sequence as a background, and a menu, independent of this image sequence, in a foreground. The camera is arranged in a direction of travel of the motor vehicle, and designed to record an image sequence of events occurring in front of the motor vehicle. The processing module is designed to process the recorded image sequence. The processing module here generates, from the recorded image sequence, a processed image sequence that exhibits a lower sharpness impression. The processing module outputs the image sequence with a reduced sharpness impression as a processed image sequence to the screen that displays the processed image sequence. The processing module may be a microprocessor, or controller.

According to one embodiment of the apparatus according to the disclosure, the camera is arranged such that a field of view of the camera corresponds to a field of view of the driver. When looking at the screen, the driver thus has approximately the same perspective as the view through a windscreen of the events directly in front of the motor vehicle.

Further features, properties and advantages of the present disclosure emerge from the following exemplary embodiment with reference to the appended figures.

DETAILED DESCRIPTION

Figure 1:
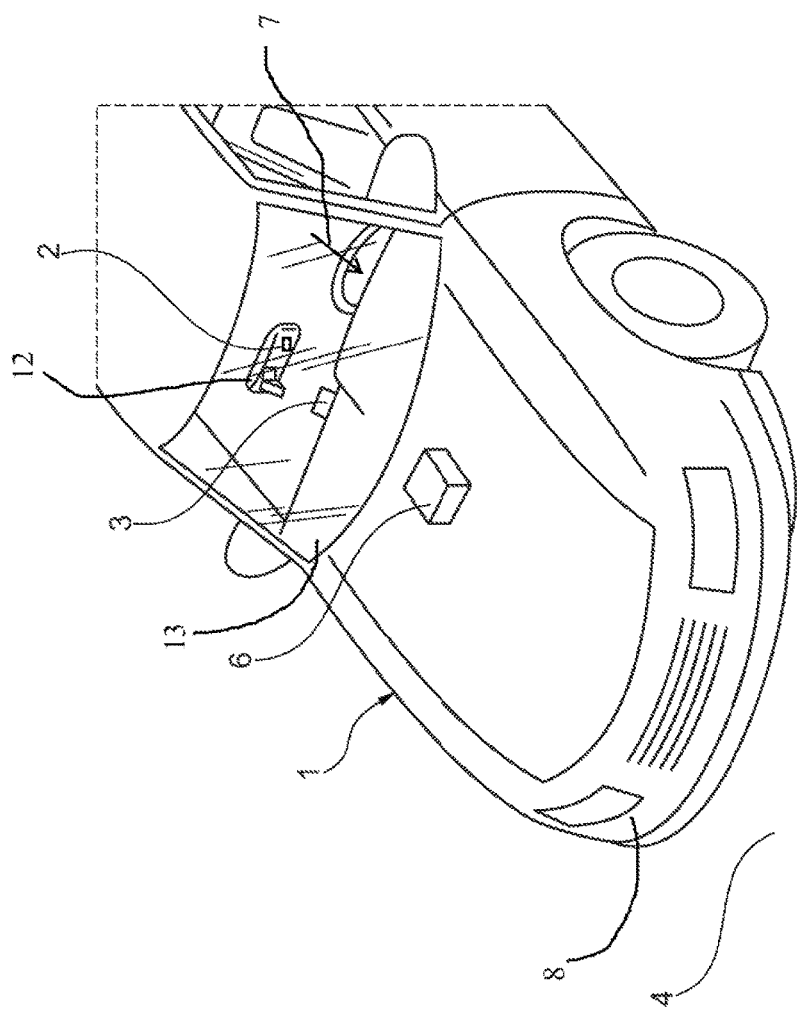
FIG. 1 shows a motor vehicle with a camera arranged in an exemplary position.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

An exemplary embodiment of the method according to the disclosure to reduce a time duration for a driver-eye adaptation for a vehicle 1 when changing a direction of view 7 from events 4 occurring in a front 8 of the motor vehicle 1 to a screen 3 arranged in a driver's compartment 5 of the motor vehicle 1 and vice versa is given below.

The method according to the disclosure is applied in a motor vehicle 1 that is moving forward, for example on a roadway 9. As illustrated in FIG. 1, the motor vehicle 1 comprises a camera 2. This camera 2 records the events 4 in front 8 of the motor vehicle 1. The camera 2 is preferably arranged in such a manner that the field of view of the camera 2 corresponds to a field of view of the driver (not shown). The camera 2 can, for example, be mounted on a rear-view mirror 12 of the motor vehicle 1.

Figure 2:
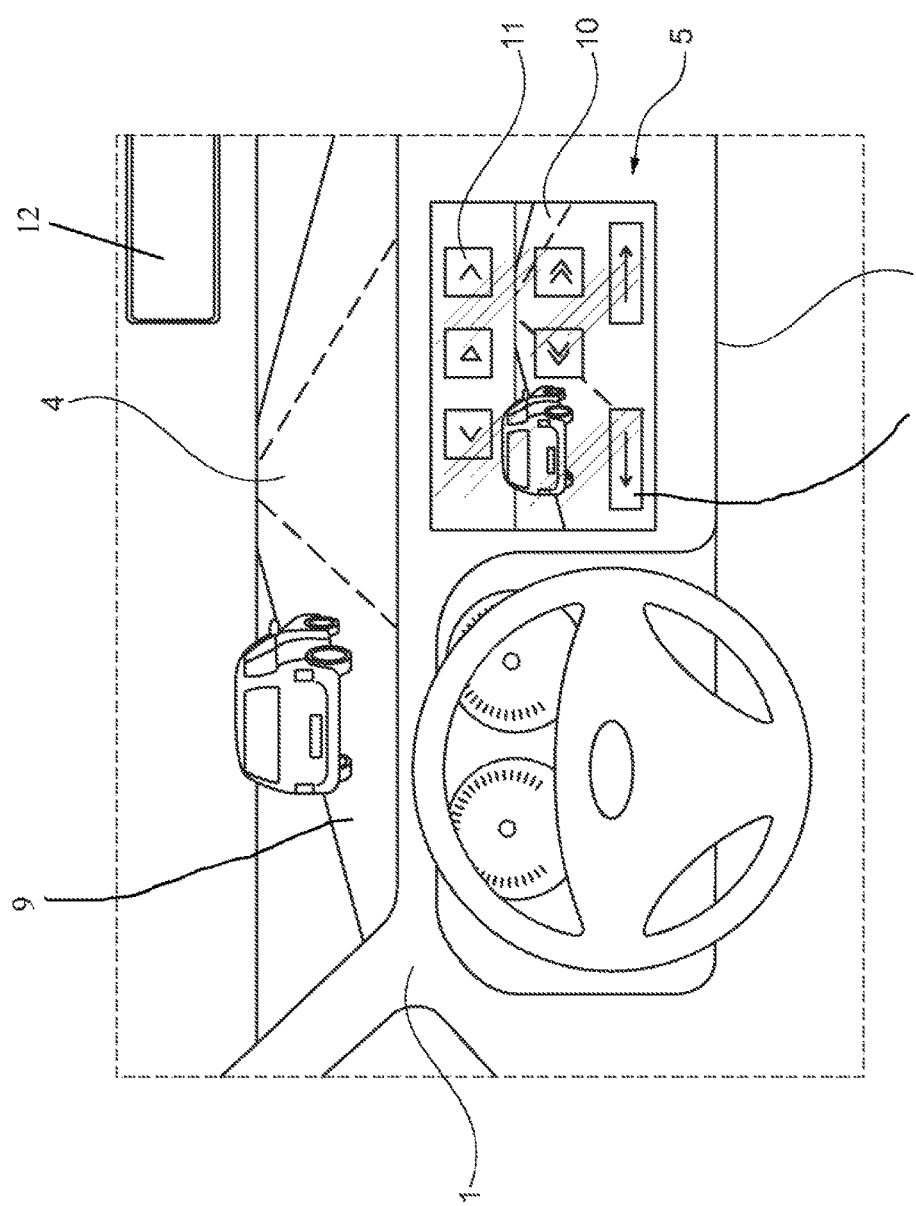
FIG. 2 shows an illustration from a point of view of a driver with an event in front of the motor vehicle.
Figure 3:
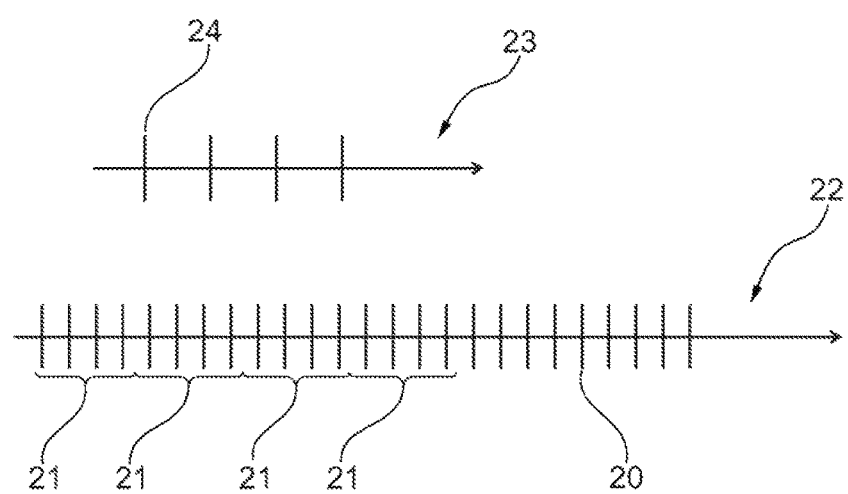
FIG. 3 shows a recorded image sequence and an associated averaged image sequence.
Figure 4:
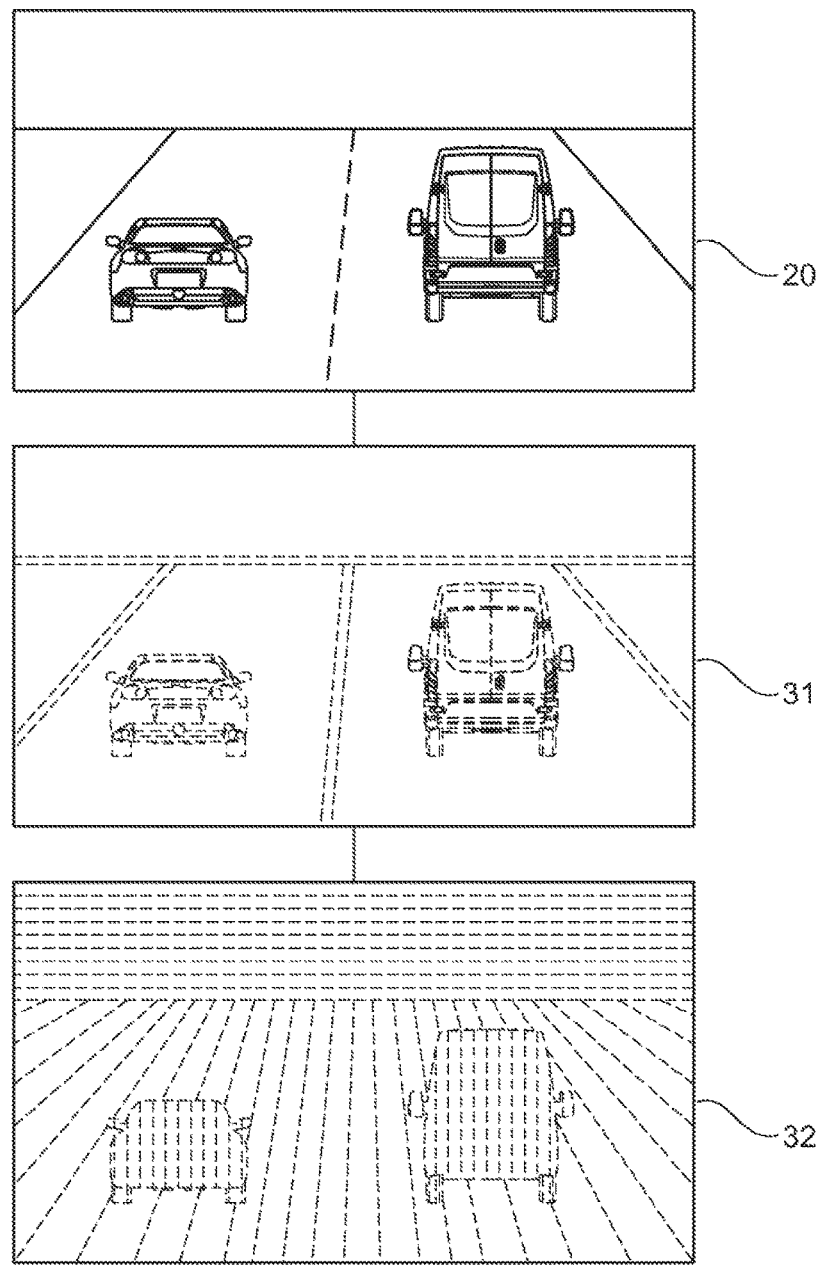
FIG. 4 shows a schematic illustration of a reduction of the sharpness impression.

The view of the drive of the motor vehicle 1 is illustrated in FIG. 2. The driver of the motor vehicle 1 can, on the one hand, look through a windscreen 13 at the events 4 in front 8 of the motor vehicle 1, and on the other hand, can see a screen 3 arranged in the driver's compartment 5 of the motor vehicle 1. The screen 3 displays two images simultaneously. Firstly a background image 10, and secondly a foreground image 14 overlaid on the background. The image in the foreground 14 is a display of a menu 11. The image in the background 10 is a single image of a background image sequence 10 that shows the events 4 in front of the motor vehicle 1. The background image 10 is processed by a processing module 6, so that the sharpness impression of the background image 10 is reduced. In this way, the driver is not given an impression that he has the situation under control by use of the screen 3 alone.

The sharpness impression of the background image can be reduced through different methods. On the one hand, the sharpness impression can be reduced by lowering a resolution. A so-called "pixilation" of the image leads to a loss of details, and thus to a reduction in the sharpness impression. On the other hand, the sharpness impression can be reduced in that a contrast range of the image is reduced. Tone values of the image are changed in such a way that brightness values of a brightest tone value and darkest tone value in the image have approached each other. Details composed of pixels with similar tone values are lost as a result. The image loses richness of detail, and thus reduces the sharpness impression. A reduction of a number of brightness steps has the same effect. Through the reduction of the brightness steps, the tone values are also again adapted to one another, so that details with similar tone values are again lost here. Smoothing is a further way of reducing the sharpness impression of the image. Smoothing matches the tone values of neighboring pixels to one another. Here again, the adaption leads to a loss of detail. The sharpness impression of an image can be further reduced in a wide variety of ways. There are many algorithms that reduce the sharpness impression, such as for example a representation of short-sightedness. Many alternative algorithms are therefore applicable.

The individual background image 31 can, on the one hand, be perceived as a stationary image or, on the other hand, as an image of a flicker-free film. The individual image 31 is an element of an image sequence 22. With a very slow updating frequency of the image sequence 22, the driver of the motor vehicle 1 is given the impression that the background image 10 is a stationary image. A change in the background image 10 does not occur during the time in which the driver is looking at the screen 3. An updating frequency of the image sequence 22 can be adjusted individually, or depending on the speed of the motor vehicle 1. Preferably the updating frequency of the image sequence 22 should be adapted to individual requirements of the driver of the motor vehicle 1. In particular, when driving at night, passage under a streetlamp should be reproduced at a correct time in an illustration of the background image 10. This adaption to the driver of the motor vehicle 1 has a result that a change in the direction of view 7 away from the events 4 in front of the motor vehicle 1 to the screen 3 in the driver's compartment 5, and in the opposite direction, exhibits a small time duration for the adaption of the driver's eyes.

The image sequence 22 recorded by the camera 2 is displayed with a reduced sharpness impression. The image 20 of the recorded image sequence 22 is here processed with one or a plurality of the said method steps, and/or is averaged over a plurality of images. The recorded image sequence 22 is divided into time segments 21, an average is taken over all the images 20 of one time segment 21, and an averaged image 24 is prepared. The averaged image 24 is again a part of an averaged image sequence 23. The reduction in the sharpness impression can here be achieved before averaging the image sequence 22 or after the preparation of the averaged image sequence 23. The latter procedure has the advantage that fewer images 24 have to be processed, and thus that the requirement of the hardware is lower.

The reduction of the sharpness impression of the background image 10 can exhibit a degree of reduction such that even larger details in the background image 10 can no longer be recognized. In an extreme case, the sharpness impression of the image 10 is reduced so strongly that all the pixels of the background image 10 only exhibit one and the same tone value. This tone value corresponds to the averaged tone value 32 that is determined over the tone values of all the pixels of the background image 10. The averaged tone value 32 depends on the events 4 in front of the motor vehicle 1. In particular when driving at night, a brightness value of the averaged tone value 32 fluctuates strongly when passing under a source of light.

The image 31, processed in this way, of an image sequence 22 is reproduced on a screen 3 in the driver's compartment 5 of the motor vehicle 1 as a background image 10 with the help of a processing module 6. A menu 11, which is independent of the background image 10 and thus independent of the events 4 in front of the motor vehicle 1, is displayed in the foreground 14 of the background image 10.

The present disclosure has been described in detail with reference to an exemplary embodiment for the purposes of explanation. An expert will nevertheless recognize that deviations from the exemplary embodiment are possible. An algorithm for the reduction of the sharpness impression can, for example, be used which is based on a simulation of a faulty vision of the eye that has not been mentioned. Apart from the spatial smoothing of the image on the basis of the tone values of a single image, a temporal smoothing over a plurality of images can be performed as an alternative or in addition. The disclosure should therefore not be restricted exclusively to the exemplary embodiment described, but only by the appended claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method to reduce a time duration for a driver-eye adaption comprising:
    changing a direction of view from events occurring in front of a vehicle to a screen arranged in a driver's compartment;
    recording an image sequence of the events via a camera arranged in a vehicle direction of travel;
    processing the image sequence to reduce a sharpness impression of individual images of the image sequence via reducing resolution;
    displaying the processed image sequence as a background image; and
    displaying, in a foreground, a menu that is independent of the image sequence.

2. The method as claimed in claim 1, wherein processing the image sequence includes:
    dividing the image sequence into time segments, averaging over individual images in respective time segments,
preparing an averaged image sequence being an average of the individual images.

3. The method as claimed in claim 2, wherein processing the image sequence includes reducing a sharpness impression of the individual images of the averaged image sequence.

4. The method as claimed in claim 2, wherein processing the image sequence includes determining, in each individual image of the image sequence, an averaged tone value of the individual images.

5. The method as claimed in claim 4, wherein displaying the image sequence as a background image includes displaying images of the image sequence in a respective tone value that depends on the events in front of the vehicle.

6. The method as claimed in claim 1, wherein the sharpness impression is further reduced via smoothing of the image.

7. A vehicle apparatus comprising:
- a screen arranged in a driver compartment to simultaneously display a processed image sequence as a background of a menu, being independent of the processed image sequence, in a foreground;
- a camera arranged in a travel direction to record an image sequence; and
- a processing module configured to generate a sharpness-impression reduced image sequence from the image sequence via a reduction of at least one of a contrast range and a resolution, and output the sharpness-impression reduced image sequence as the processed image sequence.

8. The vehicle apparatus as claimed in claim 7, wherein the camera is arranged such that a field of view of the camera corresponds to a field of view of the driver.

9. The vehicle apparatus as claimed in claim 7, wherein the processing module is further configured to divide the processed image sequence into time segments and average over individual images in respective time segments to prepare an averaged image sequence being an average of the individual images.

10. The vehicle apparatus as claimed in claim 9, wherein the processing module is further configured to reduce a sharpness impression of the individual images from the averaged image sequence.

11. The vehicle apparatus as claimed in claim 9, wherein the processing module is further configured to generate, in each of the individual images, an averaged tone of the individual images.

12. The vehicle apparatus as claimed in claim 11, wherein the processed image includes the individual images, each in a respective tone that depends on events in front of a vehicle.

13. A vehicle comprising:
- a screen arranged in a compartment to simultaneously display a background processed image, and a foreground menu independent of the processed image;
- a camera to record an image at a frequency based on a vehicle speed that adopts lower and upper limits, the lower limit being selected such that the image is stationary, the upper limit being selected such that the image is flicker-free; and
- a processor to generate the processed image, the processor further configured to, in response to dividing the image into time segments and averaging over individual images in respective time segments, prepare an averaged image being an average of the individual images.

14. The vehicle as claimed in claim 13, wherein the processed image has a sharpness impression that is reduced by a number of brightness steps.

15. The vehicle as claimed in claim 13, wherein the processor is further configured to reduce a sharpness impression of the individual images from the averaged image.

16. The vehicle as claimed in claim 13, wherein the processor is further configured to generate, in each of the individual images, an averaged tone of the individual images.

17. The vehicle as claimed in claim 16, wherein the background processed image includes the individual images, each in a respective tone that depends on events in front of the vehicle.

* * * * *